Nov. 8, 1955     H. G. HENCKEN     2,722,942
AUTOMATIC VENT VALVE
Filed Jan. 17, 1952

INVENTOR.
HAROLD G. HENCKEN
BY Pollard and Johnston
ATTORNEYS

United States Patent Office 2,722,942
Patented Nov. 8, 1955

2,722,942

AUTOMATIC VENT VALVE

Harold G. Hencken, Greenwich, Conn., assignor to Taco Heaters, Incorporated, Providence, R. I., a corporation of New York Application January 17, 1952, Serial No. 266,964

3 Claims. (Cl. 137—197)

This invention relates to an automatically operating vent valve for use in heating systems, particularly hot water heating systems, or similar arrangements, wherein it is necessary to vent air or gas from a space, and prevent the escape of water or similar liquid.

In a heating system having radiators, it is desirable to vent air or other gases therefrom so that the heating fluid can completely fill the radiator. The radiators must be filled if maximum heat transmission between the heating fluid and the walls of the radiator is to be obtained. Air finds its way into the system in various manners and it tends to collect at the top of the various radiators so as to prevent the water filling the radiator. Manually operated valves have been employed for venting of air from the radiators, but these must be individually opened so that trapped air may remain in the radiators for considerable periods of time before venting. It is required in a vent valve of the type described that liquid be prevented from escaping because such may damage the floor or surrounding objects. It also is desirable to provide for manual venting of the radiator.

One of the principal objects of the present invention is to provide an automatic vent valve which will vent air from a heating, pumping, or similar system, but which will prevent the passage of water or similar liquid therefrom, the valve being arranged so that it can be manually vented in an improved manner.

In one aspect of the invention, a flow control body having capillary pores or passages extending therethrough may be used to pass air, but controlling and restricting the rate of flow of water from the heating system to a fibrous body located between the porous rigid body and the outlet of the valve. The aforementioned fibrous body is one which is normally pervious to air but which will become substantially impervious to water upon being wet. The flow control body has intercommunicating pores or capillary passages therethrough and preferably is in the form of a rigid porous plug, the term "rigid porous plug" referring herein to the flow control body. The rigid porous plug may be integral with or separate from the valve body itself. The combination of the porous rigid plug with the fibrous body to block the flow of water from the valve will automatically permit the escape of air but will prevent escape of water from the system.

In the particular aspect of the invention involved herein, the combination includes means for freely venting the system manually. To accomplish this, the valve body may have a main outlet passage with a cavity therein, the cavity having opposed fibrous body restraining walls with an inlet passage leading to one of said restraining walls. The porous rigid body or plug is located in or in communication with the inlet passage, the plug having a central aperture therethrough. The fibrous body has a central aperture aligned generally with the aperture in said porous rigid plug. An axially movable member with a valve stem or post depending therefrom is insertable through the aperture in said fibrous body, the stem being movable into contact with a valve seat area adjacent the mouth of the aperture in said rigid plug on its outlet side or side near said cavity. When the aperture in the rigid plug is closed by contact with said stem, air will flow only through said intercommunicating pores and will pass to the main outlet apertures in the cavity walls if the fibrous body is in venting condition. The apertures preferably are transverse of the axis of the apertures in the fibrous body. The axially movable manual control member may, for example, uncover a secondary or vent outlet passage when the axially movable member is moved to open the passage through the porous rigid plug. In one form, the axially movable plug may be screw-threadedly engaged in a fibrous body retaining bushing or a member inserted in the end of the valve body. The threads can be made sufficiently loose so that air or water will escape therethrough when the manual valve stem is moved to open position uncovering the passage through the porous plug. The fibrous means upon swelling may close the secondary outlet or vent passage if it has not been opened very far.

The fibrous body preferably can be formed of a plurality of wafers or elements having central apertures therethrough. The fibrous body should be made of fibers which will swell a major amount when unconfined when the body is wet with water or the like. Also, the swelling should be sufficiently fast so as normally to close the secondary passage and the main outlet passage when the valve parts are in automatic venting relationship.

The fiber may be composed of cotton cellulose fiber or wood fiber which has not been treated in a manner reducing the swelling characteristics, such as by vulcanizing.

The body and fibers preferably can be chosen so that the dry fibers have at least a predetermined real volume in relation to the "active" or actual space occupied by the fibrous body itself and to have a predetermined swell rate when unconfined. The term "active space" can be defined as the actual space occupied by the fibrous body or plurality of wafers constituting the fibrous body after they are once wet by the liquid. "Swell rate" may be defined as the percentage increase of thickness of the normally dry fibrous body per specified unit of time. The swelled fibrous body should be such that it will more than fill the space between the opposite restraining walls of the outlet cavity in which it is located.

The fibrous body when relatively dry may have intercommunicating pores therethrough which are squeezed shut when the body is confined between the walls of the cavity. The fibrous body controls the outlet passage from the porous rigid plug or capillary control means located in the inlet passage. The size of the pores in the porous plug can be selected so as to inhibit the free flow of water and so as to pass water at such a rate that the fibrous body will swell and close off the pores through the fibrous body and to the exterior of the valve. The pores are closed off before water leaks through the body to the outside of the vent. There may be some evaporation from the outer portions of the fibrous body but this will be replenished by water passing through the porous rigid plug at a controlled rate. This will continue until air collects under the porous plug shutting off the source of replenishment of water to the fibrous body. Thereafter, evaporation will continue until the fibrous body becomes pervious to air.

In a preferred form, the fibers of the fibrous body are arranged in layers parallel to each other with a substantially random orientation of the fibers in the layers. The fibers also are substantially transverse to the passage of flow of water from the porous plug toward the outlet apertures.

When it is desired to manually vent the valve, it is merely necessary to retract or unscrew the axially movable closing member valve stem away from its seat on the aperture walls through the porous rigid plug so that water will flow freely therethrough. The water flows through the central aperture of the fibrous body and a separate secondary outlet controlled by the axially movable member or passes the loosely fitting threads of the axially movable member to the exterior of the valve. In a still further form, a rigid member and a seat may be placed on top of the fibrous body to prevent the fibers following the axially movable member as it is retracted and forms a recess in the cavity wall. This will prevent the fibrous body shutting off flow through the secondary or vent passage when the valve stem is in open relationship with the porous rigid plug.

These and other objects and advantages and features of the invention will become apparent from the following description and drawings which are merely exemplary.

Figures 1, 2:
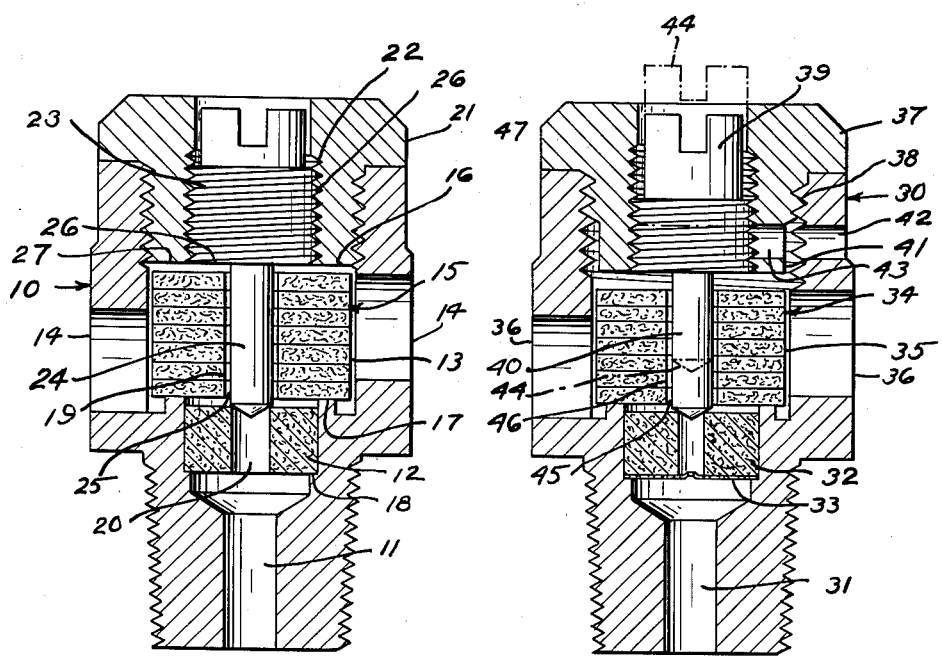
Figure 1 is a sectional view of a valve showing one form of the invention.
Figure 2 is a sectional view of a modified form of the valve.

Valve body 10 may be of suitable material, such as brass, said body having an inlet passage 11 with rigid porous plug 12 in the inlet passage. The outlet passage has a cavity 13 and main outlet apertures 14 leading into cavity 13. Fibrous body 15 is located between restraining walls 16 and 17 of cavity 13. The cavity or chamber 13 does not necessarily have to be a distinct entity, the term "cavity" being used to designate the area or space in which the fibrous body is located. In the form shown, porous plug 12 is located in an enlarged recess portion adjacent the inlet passage 11, the plug resting on shoulder 18.

The porous plug 12 can be made of various materials such as, for example, porous graphite, porous bronze, or a porous ceramic. A porous bronze plug is preferred, such a plug being formed by conventional powder metallurgy techniques. The size of powder, means of shaping, and sintering may be adjusted to produce the desired preferential control results. The materials are selected so as to have the desired porosity to control the flow of water at the proper rate to the fibrous body.

Merely by way of example, a porous bronze powder plug made by powder metallurgy processes which has been found to be satisfactory will at a pressure of 30 lbs. per square inch, pass about 2 cubic centimeters of water per minute and about 275 cubic centimeters of air per minute. The same plug at 5 lbs. per square inch will pass about .58 cubic centimeter of water per minute and about 40 cubic centimeters of air per minute. The density of such a plug can be approximately 6.2.

The plug may be an integral part of the body or may be in the straight wall portion of the inlet passageway. The porous plug can take various forms and when the correct fibrous body is used, a single or a plurality of restricted or capillary passages can be used, the passages being chosen to control properly the flow of water at the proper rate to the fibrous body. The porous plug has a central aperture or passage therethrough for freely passing water when the passage is open. It should be apparent that the aperture or passage last mentioned does not necessarily have to be in the center and that more than one could be used in conjunction with more than one valve stem or other valve arrangement.

A satisfactory fibrous body may have apparent densities of 0.80 to 1.40 and an initial swell rate for the first minute of more than 20% when exposed to water and when the body is unrestrained. The same fiber will swell 70% in five minutes. The swell rate is not necessarily a straight line relationship but should be rapid during the first minute.

The wafers comprising the fibrous body may have central apertures 19 forming a passage 25 through the fibrous body. The apertures do not necessarily have to be centered but should be aligned with the aperture 20 through the porous plug 12.

Fibrous body retaining bushing 21 may be screw-threadedly or otherwise inserted into the mouth of valve body 10. Axially movable member 23 can be screw-threadedly engaged in aperture 22 in bushing 21. Valve stem 24 depends from closing member 22 through central apertures 19 of fibrous body 15 forming passage 25 therebetween. The length of the valve stem preferably is chosen so that when it is engaged in closing relationship with the outlet of aperture 20, face 26 of the closing member will be substantially flush with face 27 of bushing 21. As the axially movable member 22 is moved outwardly, aperture 20 will be opened so that air or liquid can pass through passage 25 and out through the secondary passage defined by threads 26 in bushing 21, these threads preferably being made sufficiently loose to readily permit the passage of air and water.

The fibrous body after once becoming wet will extend between the opposite restraining walls of the cavity 13. With no water in contact with the fibrous body, and after it has time to dry at least partially, the body will become pervious to air. This may be due to the opening of the interstices between the various fibers caused by shrinkage permitting the passage of air or gas from the inlet passageway through the porous plug and through the fibrous body to the main outlet apertures of the valve. When water flows through porous plug 12 at a controlled rate, the fibers will swell and cause the body to become impervious before water can flow onto the floor or surrounding objects. When a plurality of wafers are used, air also may pass between the wafers as well as through them.

A slightly modified form of the invention is seen in Figure 2 wherein valve body 30 has inlet passage 31 with a porous rigid plug 32. Porous plug 32 also may have a piece of filter material 33 at the leading edge. Fibrous body 34 is located in cavity 35 in the outlet passage, the outlet passage having main outlet apertures 36 therein. Fibrous body retaining bushing 37 may be screw-threadedly engaged at 38 in the mouth of valve body 30. The bushing has a central aperture in which can be located axially movable member 39. Axially movable member 39 may have a depending valve stem 40; the valve stem and axially movable member being illustrated in closed position in Figure 2. The threads surrounding the bushing 37 may be cut away at 41 so as to provide a passage to secondary, or vent outlet aperture 42. Passage 43 also is provided in bushing 37 so that when the axially movable member 39 is retracted to the dot dash line position 44, a passage will be opened through ports 43 and 42 to the exterior of the valve. Post 40 forms central passage 45 between it and central apertures 46 in fibrous body 34. Instead of cutting all of the threads away as illustrated, an annular ring can be cut in 27 opposite port 42. The valve of Figure 2 works in the same general manner as Figure 1 with the exception that in addition to the secondary or vent passage provided by screw threads 47, a secondary opening is available at 43 and 42 in addition to that through the threads. There will be no passage, however, to the main outlet.

Figure 3:
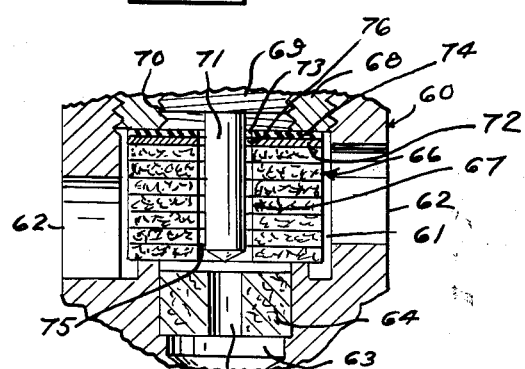
Figure 3 is a fragmentary sectional view of a modification which may be applied to Figures 1 or 2.

An alternate form is illustrated in Figure 3 wherein a rigid or stiff washer is employed on top of the fibrous body so as to prevent the fibrous body from following the axially movable member as it is retracted for venting purposes. Thus, whenever the axially movable member is in vent position, it will be impossible for the secondary passage to be sealed by the fibrous body with the aperture 20 open.

Valve body 60 has a main cavity 61 with main outlet apertures 62. Inlet passage 63 has a rigid porous plug 64 with an aperture 65 therethrough. Fibrous body 66 may be composed of a plurality of washers having centrally located apertures 67. Bushing 68 is screw-threadedly engaged in the valve body 60, the bushing carrying axially movable member 69 screw-threadedly mounted therein. The secondary or vent passage is provided by threads 70 as in Figure 1. The valve stem 71 is in venting position in Figure 3. Rigid washer or member 72 may have a central aperture 73 therethrough, with a resilient seal washer 74 thereon, the washers 72 and 74 may be replaced by a suitable relatively stiff vulcanized washer. A passage 75 for water to the exterior of the valve is provided between valve stem 71 and central aperture 67, openings 73, 76, and the secondary path 70. The valve of Figure 3 functions in other aspects the same as Figures 1 and 2 and may have other parts similar to those illustrated therein.

Various changes may be made in the details of construction without departing from the spirit of the invention except as defined in the appended claims.

What is claimed is:

1. An automatic air vent valve comprising a valve body, a main outlet passage in said body having a cavity therein with main outlet aperture means and opposed restraining walls, an inlet passage in said body connected to said cavity through one of said opposed walls, the other of said opposed walls having an opening therethrough to the exterior of the valve body, a water absorbent fibrous body in said cavity, said fibrous body having a passage therethrough and being normally pervious to air passing to said main outlet aperture means and becoming impervious to water upon absorption of water, a porous rigid plug having intercommunicating capillary pores therethrough in said inlet, said porous rigid plug having a free passage therethrough, said capillary pores passing air when the free passage is closed but restricting the passage of water to a rate such that absorption of water by the fibrous body will take place at substantially the same rate as passage of water through said capillary pores when the free passage is closed, a screw-threaded axially movable member mounted in said opening in the wall opposite the inlet and communicating with said passages in the fibrous body and porous rigid plug, said movable member having means movable through said fibrous body passage into and out of closing relationship with said free passage in said porous rigid plug, so as to vent said valve through said passages in said fibrous body and a vent passage controlled by said axially movable member when said member is moved to open said passage in the porous rigid plug.

2. An automatic air vent valve comprising a valve body, an outlet passage in said body having a cavity therein and main outlet apertures, an inlet passage in said body connected to said cavity, said body having a threaded opening to said cavity opposite said inlet passage, a water absorbent fibrous body between opposed walls in said cavity, said body having a central passage and being normally pervious to air passing to said outlet apertures and becoming impervious to water upon being wet, a porous rigid body in said inlet, said rigid body having a free passage therethrough for freely passing water and having intercommunicating pores therethrough passing air but restricting the passage of water to a rate such that absorption of water by the fibrous body will take place at substantially the same rate as said passage of water when said free passage is closed, a screw-threaded member mounted in said threaded opening in said valve body and communicating with said passages in said fibrous body and said rigid body, an outlet vent passage to the exterior of said valve body from said threaded opening controlled by said member, and a valve stem mounted on said plug and extending through said passage in said fibrous body and into closing relationship with said free passage of the rigid plug, so as to pass water from said valve freely through the passages in said fibrous body and porous body, and said vent passage when the screw-threaded member is unscrewed and the outlet vent passage from said rigid body opened.

3. An automatic air vent valve comprising a valve body, an outlet passage in said body having a cavity therein and main outlet apertures, an inlet passage in said body connected to said cavity, said body having a threaded opening into said cavity, a water absorbent fibrous body in said cavity, said body having a central passage and being normally pervious to air passing to said main outlet aperture and becoming impervious to water upon absorption of water, a porous rigid body in said inlet, said rigid body having a central free passage therethrough and having intercommunicating pores therethrough passing air but restricting the passage of water to a rate such that absorption of water by the fibrous body will take place at substantially the same rate as said passage of water when the free passage is closed, a screw-threaded member mounted in said threaded opening and communicating with said passages in said fibrous body and rigid body, said member having valve means movable into and out of closing relationship with said free passage in the rigid plug so as to vent said valve through the passages in said fibrous body and said plug and past the screw threads of said plug to the exterior of the valve when the plug is moved to open said free passage in the rigid body, and a rigid sealing member between said fibrous body and the wall of said cavity into which said screw-threaded member opens, said sealing member straddling the opening of said screw-threaded member into said cavity so as to prevent the fibrous body following the screw-threaded member when it is retracted relative to the cavity.

References Cited in the file of this patent

UNITED STATES PATENTS

| | | |
|---|---|---|
| 2,153,726 | Scoppola | Apr. 11, 1939 |
| 2,467,217 | Mikeska | Apr. 12, 1949 |
| 2,601,216 | White et al. | June 17, 1952 |